(12) United States Patent
Linke et al.

(10) Patent No.: US 10,124,372 B2
(45) Date of Patent: Nov. 13, 2018

(54) SCREEN BAR, BAR SCREEN AND METHOD FOR PRODUCING A SCREEN BAR

(71) Applicants: THYSSENKRUPP STEEL EUROPE AG, Duisburg (DE); THYSSENKRUPP INDUSTRIAL SOLUTIONS AG, Essen (DE)

(72) Inventors: Natasja Linke, Kamp-Lintfort (DE); Andreas Kern, Ratingen (DE); Hans-Joachim Tschersich, Dorsten (DE); Guido Leuschen, Bielefeld (DE)

(73) Assignees: THYSSENKRUPP STEEL EUROPE AG, Duisburg (DE); THYSSENKRUPP INDUSTRIAL SOLUTIONS AG, Essen (DE)

( * ) Notice: Subject to any disclaimer, the term of this patent is extended or adjusted under 35 U.S.C. 154(b) by 217 days.

(21) Appl. No.: 14/900,316

(22) PCT Filed: Jun. 13, 2014

(86) PCT No.: PCT/EP2014/062378
§ 371 (c)(1),
(2) Date: Dec. 21, 2015

(87) PCT Pub. No.: WO2014/206772
PCT Pub. Date: Dec. 31, 2014

(65) Prior Publication Data
US 2016/0368024 A1    Dec. 22, 2016

(30) Foreign Application Priority Data
Jun. 24, 2013   (DE) .................. 10 2013 106 570

(51) Int. Cl.
*B07B 1/46* (2006.01)
*C21D 6/00* (2006.01)
(Continued)

(52) U.S. Cl.
CPC ............. *B07B 1/4618* (2013.01); *B07B 1/12* (2013.01); *B23K 20/04* (2013.01); *B23K 20/227* (2013.01);
(Continued)

(58) Field of Classification Search
None
See application file for complete search history.

(56) References Cited

U.S. PATENT DOCUMENTS

| 3,743,005 A | 7/1973 | Veitl et al. |
| 4,831,708 A | 5/1989 | Yoshiwara et al. |

(Continued)

FOREIGN PATENT DOCUMENTS

| DE | 2 146 227 A1 | 3/1972 |
| DE | 41 26 240 C1 | 7/1992 |

(Continued)

OTHER PUBLICATIONS

German Language International Search Report for International patent application No. PCT/EP2014/062378; dated Aug. 18, 2014.
(Continued)

*Primary Examiner* — Benjamin M Kurtz
(74) *Attorney, Agent, or Firm* — thyssenkrupp North America, Inc.

(57) ABSTRACT

A screen bar for a bar screen may comprise a steel composite sheet having at least three steel layers: a top layer, a core layer, and a bottom layer. The top, core, and bottom steel layers may be interconnected by roll cladding in a non-releasable manner. In some examples, the core steel layer may have a higher deformability than the top steel layer and the bottom steel layer. Likewise, the top steel layer and the bottom steel layer may have higher hardnesses than the core steel layer. Such screen bars have extended service life and can be manufactured more cost effectively, amongst other (Continued)

benefits. Methods for manufacturing such screen bars may involve a variety of steps including hot rolling and/or heat-treating.

12 Claims, 1 Drawing Sheet

(51) Int. Cl.
| | |
|---|---|
| *B07B 1/12* | (2006.01) |
| *B23K 20/227* | (2006.01) |
| *B23K 20/04* | (2006.01) |
| *B23K 101/18* | (2006.01) |
| *B23K 103/04* | (2006.01) |
| *B23K 103/18* | (2006.01) |
| *C22C 38/02* | (2006.01) |
| *C22C 38/04* | (2006.01) |
| *C22C 38/06* | (2006.01) |
| *C22C 38/44* | (2006.01) |
| *C22C 38/48* | (2006.01) |
| *C22C 38/54* | (2006.01) |

(52) U.S. Cl.
CPC ............ *C21D 6/004* (2013.01); *C21D 6/005* (2013.01); *C21D 6/008* (2013.01); *B23K 2101/18* (2018.08); *B23K 2103/04* (2018.08); *B23K 2103/18* (2018.08); *C22C 38/02* (2013.01); *C22C 38/04* (2013.01); *C22C 38/06* (2013.01); *C22C 38/44* (2013.01); *C22C 38/48* (2013.01); *C22C 38/54* (2013.01)

(56) References Cited

U.S. PATENT DOCUMENTS

| | | | | |
|---|---|---|---|---|
| 4,983,289 | A | * | 1/1991 | Salomon .................. B04B 3/04 210/360.1 |
| 2003/0029530 | A1 | | 2/2003 | Junius |
| 2003/0132149 | A1 | | 7/2003 | Seidl |
| 2011/0111252 | A1 | * | 5/2011 | Becker ................. B32B 15/011 428/624 |

FOREIGN PATENT DOCUMENTS

| | | |
|---|---|---|
| DE | 100 11 758 A1 | 9/2001 |
| DE | 10 2005 006 606 B3 | 3/2006 |
| DE | 603 07 789 T2 | 8/2007 |
| EP | 0 265 421 A2 | 4/1988 |

OTHER PUBLICATIONS

English translation of International Search Report for International patent application No. PCT/EP2014/062378; dated Aug. 18, 2014.
English translation of the abstract of DE 10 2005 006 606 B3.
English translation of the abstract of EP 0 265 421 A2.
English translation of the abstract of DE 41 26 240 C1.

* cited by examiner

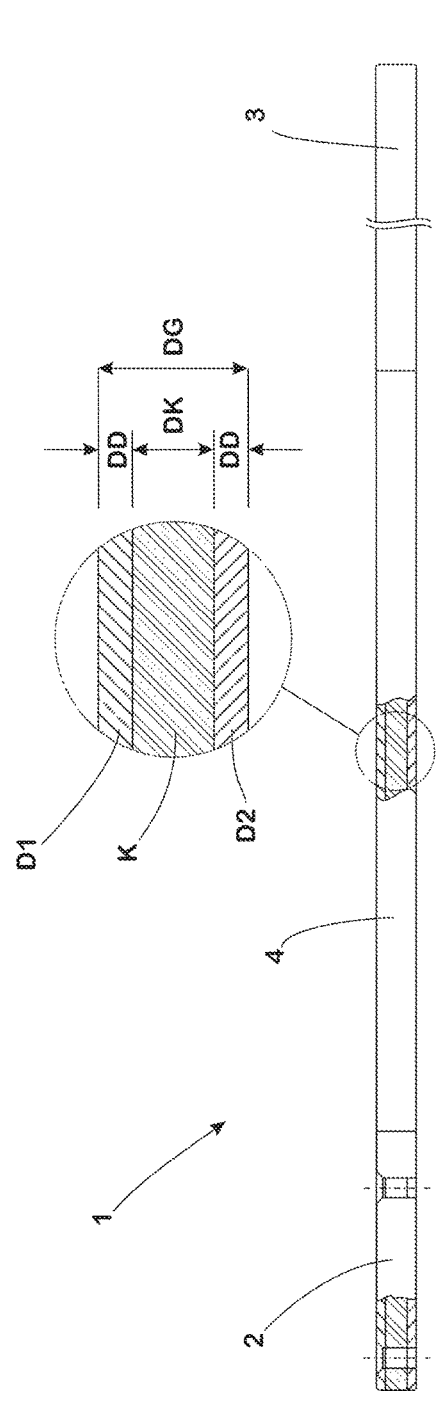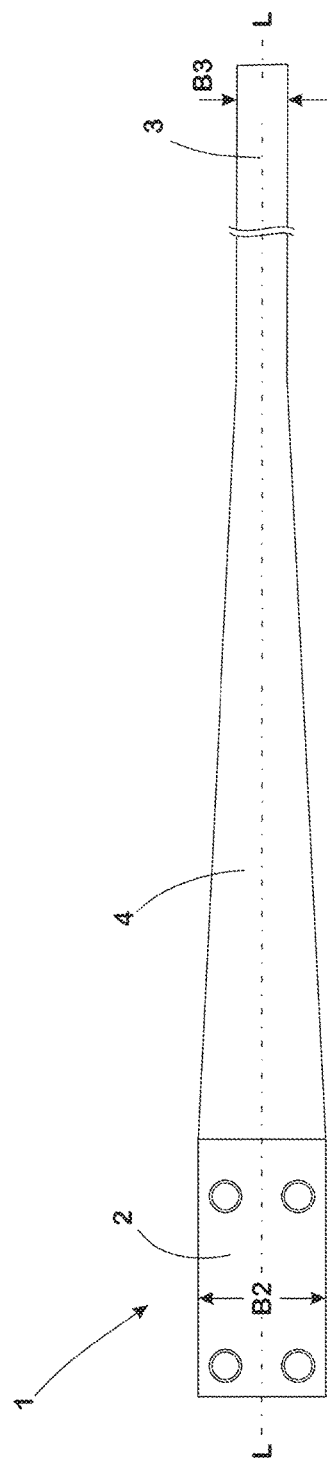

SCREEN BAR, BAR SCREEN AND METHOD FOR PRODUCING A SCREEN BAR

CROSS REFERENCE TO RELATED APPLICATIONS

This application is a U.S. National Stage Entry of International Patent Application Serial Number PCT/EP2014/062378, filed Jun. 13, 2014, which claims priority to German Patent Application No. DE 102013106570.8 filed Jun. 24, 2013, the entire contents all of which are incorporated herein by reference.

FIELD

The present disclosure relates to screen bars, to bar screens manufactured using screen bars, and to methods for manufacturing screen bars.

BACKGROUND

Bar screens are used for screening comparatively large solids from flowing fluids, in particular liquids and free-flowing bulk material and similar, in the most varied fields of engineering. Examples of bar screens of this type are disclosed in DE 603 07 789 T2, DE 41 26 240 C1, and EP 0 265 421 A2.

It is a common feature of the known bar screens that the screen effect is achieved by screen bars which are disposed so as to be mutually parallel and which by way of one end thereof are held on a support unit and by way of the other end are freely suspended in the flow or conveying path of the product to be screened. The gap width interdisposed between the screen bars here determines the minimum size above which the particles impacting the screen are separated or up to which particle size they may pass through the screen. Since the ends of the screen bars run out freely, the risk of blockage by the screened product is low. The screen bars here are typically disposed in one plane. Conveying of the screened product via the bar screen here may also be performed by the screen bars toward the free end thereof being downwardly inclined. Linear conveying of the screened product is then typically supported by an up-and-down movement of the free end of the screen bars, which is caused by an eccentric.

Irrespective of the field of application, screen bars are subjected to high dynamic load during use, since the respective particles to be filtered in each case have a comparatively large mass and thus impact the bars with a high kinetic energy. At the same time, screen bars which are employed for example in comminution machines, such as hammer crushers or shredders, are exposed to enormous load by abrasive wear.

The effort associated with the replacement of screen bars, which is required at short intervals, is significant. As a consequence there is the demand for screen bars to be immune to abrasive wear, on the one hand, and to have sufficiently good spring characteristics, on the other hand, so as to be able to also absorb hard shocks which arise at high frequency, without the risk of a material failure.

In order to meet this profile of requirements, freely suspended screen bars of the type discussed here in practice are typically made from spring-steel varieties or other high-strength steel materials which permit sufficient elastic deformation.

As is explained in DE 41 26 240 C1, the wear resistance of screen bars which are manufactured from such steel varieties and which in the respective prior art are destined for vegetable oil presses may be further increased in that the screen bars are provided with a wear-resistant coating. The coating is to consist of a composite material having 60-80% by volume of a hard material and 20-40% by volume of a solder alloy. Preferably, tungsten carbide and/or chromium carbide is to be used as a hard material and nickel-based solders, for example a Ni—Cr—B—Si alloy, are to be used as a solder alloy.

The advantage of a composite material coating of this type is said to lie in that said composite material coating adheres particularly well to the respective steel substrate and offers good protection against wear. However, a manufacturing method which is comparatively complex and which moreover may cause thermally-induced distortion of the screen bars which have to be individually coated is required to this end.

BRIEF DESCRIPTION OF THE FIGURES

FIG. 1 is a cut-away view of an example screen bar.
FIG. 2 is a plan view of an example screen bar.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

Against this background the object of the invention lies in providing a screen bar and a bar screen which is equipped with such a screen bar, which at more cost-effective manufacturing and extended service life have improved properties in use. Moreover, a method by way of which such screen bars may be manufactured in a cost-effective manner is to be stated.

The achievement of the object mentioned above in relation to the bar screen according to the invention lies in that such a bar screen is equipped with screen bars of the type according to the invention.

Advantageous design embodiments of the invention are mentioned in the dependent claims and, like the general concept of the invention, will be explained in more detail below.

The invention is based on the concept of making screen bars from a multi-layer steel composite material which has at least one core layer which in turn on both its planar sides is in each case covered with a top layer. Those having ordinary skill in the art will understand that the two top layers may also be referred to as "outer" layers. Likewise, one of the two top layers may also be referred to as a "bottom" layer. Moreover, the outer top layers here consist of hard steel, whereas the inner core layer consists of steel which is more deformable than the respective steel of the top layers and as such is capable of absorbing elastic and if need be plastic or partially plastic deformations, without the risk of breakage. The higher deformability of the core layer here is expressed in that the characteristic values for the deformability thereof, in particular for elongation after fracture, are better than the corresponding characteristic values of the top layers. By contrast, the top layers which consist of harder steel yet have lower deformability offer the required wear resistance, in particular in relation to abrasive wear, which the steel used in the core layer on its own could not achieve.

Interlinking of the top layers and the core layer according to the invention is performed by roll cladding. In this fashion a steel composite sheet in which the hard top layers ensure the required resistance to abrasive wear and the inner core layer ensures the necessary deformability in order to absorb also intense load which arises in rapid sequence, without the risk of a material failure, is achieved with a view to the use thereof in the manufacturing of screen bars.

A screen bar according to the invention for a bar screen is accordingly characterized in that said screen bar is made from a steel composite sheet which is composed of at least three steel layers which lie on top of one another and are non-releasably interconnected by roll cladding, of which steel layers the respective outboard steel layers are in each case a top layer, and the steel layer between the top layers is a core layer, wherein the core layer has higher deformability than the top layers and the top layers have a higher hardness than the core layer.

By consisting in the fashion mentioned above of a steel composite sheet, a screen bar according to the invention has an optimal combination of high deformability and wear resistance which conventional screen bars which are made of high-strength steel varieties or of spring-steel varieties alone cannot achieve.

The proportion of the thickness of the core layer in the total thickness of the steel composite sheet from which the screen bar according to the invention is manufactured, is optimally at least 40%, in particular 45-55%. By way of a breakdown of this type an optimal distribution of wear resistance and resistance to mechanical loads results. The remainder of the total thickness of the steel composite plate is then expediently broken down so as to have identical parts as the thickness of the top layers. However, depending on the type of use, it may also be advantageous for the top layer, which during use is in the direct flow of the screened product, to be configured in a thicker manner, for example.

In principle, the advantages of the invention are already achieved when the core layer consists of a single steel layer. However, insofar as the core layer across its thickness is also to be apportioned various properties or this is expedient for reasons of production technology, the core layer may also consist of two or more layers which lie on top of one another and which again are interconnected by roll cladding. Such a multi-layer construction may be expedient, for example, in the case where the transition from the hard top layers to the core layer which in comparison to the former is more readily deformable is to be performed in a plurality of steps, so as to avoid abrupt property-related breaks in the steel composite sheet. Insofar as the core layer is configured in a multi-layer manner it may be expedient in this respect for the layers of the core layer to be configured in a uniformly thick manner.

The top layers may consist of martensitic steel, for example, which enables high hardness. The steel alloy of the top layer here should be selected such that the top layers have a hardness of in excess of 500 HBW.

Steel which provides optimal hardness for the top layer, apart from iron and unavoidable impurities, contains (in wt. %) 0.35-0.45% C, 0.15-0.30% Si, 0.75-0.95% Mn, 0.07-0.1% Al, 0.8-0.95% Cr, 0.017-0.028% Nb, 0.15-0.28% Mo, 1.1-1.3% Ni, 0.0015-0.0035% B, and 0.0007-0.0030% Ca.

The steel may in particular contain (in wt. %) 0.35-0.38% C, 0.15-0.30% Si, 0.75-0.90% Mn, 0.08-0.1% Al, 0.80-0.95% Cr, 0.017-0.027% Nb, 0.22-0.28% Mo, 1.10-1.30% Ni, 0.0015-0.0035% B, 0.0007-0.0030% Ca, residual iron and unavoidable impurities. Likewise, steel which, apart from iron and unavoidable impurities, contains (in wt. %) 0.42-0.45% C, 0.15-0.20% Si, 0.80-0.95% Mn, 0.07-0.1% Al, 0.80-0.95% Cr, 0.021-0.028% Nb, 0.15-0.20% Mo, 1.10-1.30% Ni, 0.0015-0.0035% B, 0.0010-0.0030% Ca, residual iron and unavoidable impurities, is included in the alloy which is provided according to the invention for the top layers.

The combination of the alloy components of the steel which according to the invention is proposed for the top layer leads to high hardness.

A carbon content of 0.35-0.45% here is of particular relevance, in order for the required high wear resistance in the outer layer to be ensured. During hardening martensite is formed as a structural component of the steel, hardness of the latter increasing as the carbon content is increased. A minimum carbon content of 0.35 wt. % is required for the envisaged hardness of in excess of 500 MBW. At the same time, the carbon content should be restricted to a maximum of 0.45 wt. %, so as to avoid brittleness in the outer layers.

Chromium contents of 0.8-0.95 wt. % and molybdenum contents of 0.15-0.28 wt. % in each case promote reception to hardening and through-hardenability. An increase in the wear resistance is additionally promoted by the carbide-forming effect of chromium.

According to the invention, Al is present in the steel provided for the top layer in contents of 0.07-0.1 wt. %, so as to bind the nitrogen which is present in the steel, such that the boron which is present in contents of 0.0015-0.0035 wt. % can develop its strength-enhancing effect.

N is likewise bound by way of Nb which is additionally added in contents of 0.017-0.028 wt. %. In this fashion, boron in atomic form may delay the structural transformation and in this way improve hardenability. Aluminum contents in excess of 0.1 wt. % lead to free aluminum, on account of which the risk of undesirable aluminum oxide forming is increased. Niobium is effective in contents in excess of 0.015 wt. %. The niobium content is limited to 0.30 wt. %, so as to avoid the formation of niobium carbide which is detrimental to toughness.

The additionally required deformability is achieved by the targeted addition of nickel in contents of 1.10-1.30 wt. %. By reducing the critical cooling rate, nickel moreover increases through-hardening and through heat treatment.

An optimal combination of hardness and deformability of the core layer in a screen bar according to the invention is established when the core layer has a hardness of 350-500 HBW.

Insofar as hardness values HBW are stated here, these are values of Brinell hardness. This is determined according to DIN EN ISO 6506-1 as a hardness test according to Brinell, using a hard-metal ball (HBW) which has a diameter of 10 mm, while applying a load of approximately 30 kN to three points of a cross section which are distributed so as to be equidistant across the sheet thickness. The cross section in the case of the top layer comprises the total thickness of the top layer. In the case of the core layer, said cross section, proceeding from the border between the top layer and the core layer up to the center of the core layer, comprises half the thickness of the core layer. A mean value which is stated as the hardness value is formed from the three individual values.

Apart from iron and unavoidable impurities, steel which is suitable according to the invention for the core layer in the manufacture of a screen bar contains (in wt. %) 0.16-0.22% C, 0.15-0.40% Si, 0.90-1.45% Mn, 0.02-0.1 dissolved Al, 0.45-1.05% Cr, up to 0.033% Nb, up to 0.65% Mo, up to 2.0% Ni, up to 0.0035% B and 0.0007-0.0030% Ca.

In particular on account of the reduced carbon content, and utilizing the active principles which have already been explained in the context of the steel proposed for the top layer, the alloy contents of the steel which according to the invention is suitable for the core layer are set such that an optimal ratio of strength to deformability of the core-layer steel results.

For example, the known steels having the material codes 1.8942 and 1.8722 are included in the alloy which is provided according to the invention for the core layer.

The method according to the invention for manufacturing a screen bar according to the invention comprises the following operational steps:

providing a first hot-rolled steel plate which forms the core layer of the steel composite sheet;

providing two hot-rolled steel plates which form the top layers;

optionally cleaning and straightening the faces of the steel plates, by way of which the steel plates in the following step are placed on top of one another;

forming a stack of steel plates lying on top of one another, by placing the steel plates which form the core layer onto the steel plate which forms the first top layer, and placing the plate which forms the second top layer on the core layer;

connecting the steel plate layers of the stack in a fixed and non-releasable manner;

heating the stack to an initial temperature for hot rolling;

hot rolling the stack in one or a plurality of hot-rolling steps to a hot-rolled steel composite sheet, wherein the stack is optionally reheated to the initial temperature for hot-rolling prior to each hot-rolling step;

optionally heat-treating the steel composite sheet, the heat treatment comprising:

heating the steel composite sheet to a temperature which is above the highest of the Ac3 temperatures of the steel types of which the top layers and the core layer of the steel composite sheet consist, subsequent quenching of the heated steel composite sheet at a cooling rate which is sufficient for generating hardened structures in the top layers of the steel composite sheet, and optionally tempering of the quenched steel composite sheet;

cutting the screen bar from the steel composite sheet;

optionally post-machining of the screen bar cut from the steel composite sheet.

In practice a steel composite sheet which is used according to the invention for manufacturing a screen bar of the type according to the invention and which is constructed from at least three layers and is processed as a heavy plate (thickness >3 mm, in particular >50 mm) may be manufactured in that initially in a conventional fashion by way of hot rolling at least three substantially ashlar-shaped heavy plate plates are produced using different steel varieties. Two plates which are produced from the same steel enabling high hardness, for example, are destined for the top layers of the finished steel composite sheet, while the third plate which is produced from a steel of lesser hardenability in the finished steel composite sheet forms the core layer.

Insofar as this is expedient in terms of application-related considerations, the steel materials of the plates envisaged for the top layers may be individually adapted to the respective requirements. By contrast, the plate forming the core layer consists of a steel material which in comparison with the steel of the top layers has high deformability.

In the case of a tri-layer steel composite the thickness of the two top layers is, for example, in each case 25% of the total thickness, while the core layer occupies the remainder of the total thickness. The ratio of the thickness of the provided plates is sized accordingly. If the core layer is to be composed of a plurality of layers, the plates provided for the individual layers of the core layer may be of identical thickness. It may be expedient also in this case for the plates provided for the top layers and for the plates provided for the layers of the core layer to be of identical thickness. This will then result in a steel composite sheet which has layers or plies which are likewise of identical thickness.

If and when required, the plate surfaces which are placed on top of one another in the subsequent operational procedure are subjected to surface treatment. In this treatment the surface shape of the one plate is adapted to the surface shape of the other plate in such a manner that the respective surfaces lie tightly on top of one another and uniform contact across a large area is ensured when the plates are stacked on top of one another. To this end, undesirable foreign matter such as mill scale is removed from the surfaces and the latter are chemically and physically activated.

Subsequently, the plates which have optionally been pretreated in this way are placed on top of one another so as to form a stack. Stacking commences with a plate which is provided for the first top layer. The plate which is provided for the core layer is placed on top thereof. If a plurality of plates are provided for the core layer, these plates are stacked on top of the plate which is assigned to the first top layer. The plate which in the finished steel composite sheet forms the second top layer in turn completes the stack.

The plates of the stack which lie on top of one another are subsequently fixedly interconnected. This may be performed by welding.

The fixed stack which has been formed in this way is heated to an initial temperature for hot rolling and hot rolled to form a heavy plate. Hot rolling may be performed in one step or in two or more steps. Each of these hot-rolling steps may comprise one, two, or a plurality of hot-rolling passes to which the rolled product has to be subjected. If a plurality of rolling steps are carried out, reheating to the required initial temperature for hot rolling should be performed prior to each hot-rolling step.

The hot-rolled steel composite sheet which has been obtained in this way is subsequently subjected to heat treatment. To this end the heavy plate is heated to a temperature which is in excess of the highest Ac3 temperature of the steel materials provided for the top layer and the core layer. Subsequently, the steel composite sheet which has been tempered in this manner in a suitable quenching medium is quenched so rapidly that martensite is largely formed in the two top layers of the roll-clad steel. In practice, cooling rates of at least 25 K/s are suitable therefor. The hardness of the individual layers may if and when required be set by a tempering treatment at a tempering temperature which lies below the Ac1 temperature of the respective steel.

The screen bar 1 which is integral and consists of a steel composite sheet and in terms of its longitudinal axis L is symmetrically shaped has a rectangular connector portion 2 in the plan view. The connector portion 2 forms an end portion of the screen bar 1 by way of which the screen bar when in use is fastened to a holder (not shown) of a conventional bar screen (also not illustrated). Furthermore, the screen bar, on the other end thereof, has a bar portion 3 configured thereon, having a width B3 which is smaller than the width B2 of the connector portion 2. The connection between the connector portion 2 and the end portion 3 forms a transition portion 4 which, when viewed in the plan view, proceeding from the connector portion 2 tapers off in the direction of the bar portion 3. The length of the bar portion 3 is a multiple of the length of the connector portion 2 and of the transition portion 4.

In order for the screen bar 1 to be manufactured, two heavy plates made from steel A, which are provided for the top layers D1, D2 of the finished steel composite sheet, and one heavy plate made from steel B for the core layer, have been manufactured by hot rolling. The dimensions of the plates and the composition of the steel varieties A and B are stated in table 1.

Following cleaning and straightening of the mutually facing surfaces, the plates have been stacked to form a stack, the plate provided for the core layer being interdisposed between the two plates provided for the top layers. The plates which are tightly stacked on top of one another in the stack have subsequently been interconnected by welding. The fixed stack which has been formed in this way has a total thickness of 250 mm.

This stack has been heated to an initial temperature for hot rolling of 1250° C. and in five reversing rolling passes has been pre-rolled to a thickness of 160 mm. Hot-roll cladding has simultaneously taken place during this forming by hot rolling. Final rolling of the pre-rolled plate pack to form a steel composite sheet has been performed in a second step, following reheating to an initial temperature for hot rolling of 1250° C. After final rolling the total thickness DG of the steel composite sheet was 60 mm, wherein the thickness DD of the two top layers D1,D2 consisting of steel A was in each case 15 mm, and the thickness DK of the core layer K of steel B was 30 mm.

The steel composite sheet has subsequently been subjected to heat treatment, so as to set the required hardness of the top layers D1, D2. To this end the steel composite sheet has been heated in a penetrating manner in a roller hearth furnace to 920° C. and subsequently has been rapidly quenched in a water quencher by impinging both sides with pressurized water at a cooling rate of at least 25 K/s to a temperature below 150° C. By way of this hardening procedure a hardness which has been determined in the manner explained above according to DIN EN ISO 6506-1 of 621 HBW 10/3000 in the top layers D1, D2 and a hardness of 437 HBW 10/3000 in the core layer K has been achieved. Accordingly, the core layer K displayed an elongation after fracture of approximately 9%, which is significantly higher than that of the top layers D1, D2. Elongation after fracture here was determined by testing a round bar specimen according to DIN EN ISO 6892—Part 1, Method B, which round bars were made as proportionate bars having the longitudinal axis thereof so as to be parallel with the direction of rolling.

The screen bar 1 has subsequently been cut out of the steel composite sheet which has been hardened in this way by a thermal cutting method, for example by laser cutting, or by another beam cutting method, for example water jet cutting, and has been subjected to mechanical and machining processing, by way of which the final shape of said screen bar 1, which is required for installation, has been achieved.

Comparative tests based on a typical processed product (70% granite, 30% quartz diorite) and on a mix of abrasive wear and impact wear have demonstrated that the screen bars which consist of the steel composite sheet which has been produced according to the invention in the above manner have a service life which is five times that of screen bars which have been manufactured in the conventional way from traditional high-strength and liquid-quenched and tempered special construction-grade steel having the material code 1.8933 and the EN abbreviation S960QL.

TABLE 1

| Plates for | Steel | Thickness [mm] | Width [mm] | Length | C | Si | Mn | Al | Cr | Nb | Mo | Ni | B |
|---|---|---|---|---|---|---|---|---|---|---|---|---|---|
| | | | | | | | | | [wt. %] *) | | | | |
| Top layers | A | 62.5 | 1000 | 4800 | 0.43 | 0.20 | 0.84 | 0.110 | 0.84 | 0.024 | 0.15 | 1.10 | 0.0023 |
| Core layer | B | 125 | 1000 | 4800 | 0.16 | 0.22 | 0.92 | 0.077 | 0.47 | 0.029 | 0.03 | 0.04 | 0.0021 |

*) Residual iron and unavoidable impurities

What is claimed is:

1. A screen bar for a bar screen, the screen bar comprising: a steel composite sheet comprising a top steel layer, a core steel layer, and a bottom steel layer, wherein the top steel layer, the core steel layer, and the bottom steel layer are non-releasably interconnected by roll cladding, wherein the core steel layer has a higher deformability than the top steel layer and the bottom steel layer, wherein the top steel layer and the bottom steel layer have higher hardnesses than the core steel layer, wherein the top steel layer and the bottom steel layer consist of martensitic steel, wherein a composition of the top and bottom steel layers contains iron, impurities, and in percentage by weight 0.35-0.45% C, 0.15-0.30% Si, 0.75-0.95% Mn, 0.07-0.1% Al, 0.8-0.95% Cr, 0.017-0.028% Nb, 0.15-0.28% Mo, 1.1-1.3% Ni, 0.0015-0.0035% B, and 0.0007-0.0030% Ca.

2. The screen bar of claim 1 wherein a thickness of the core steel layer is at least 40 percent of a total thickness of the steel composite sheet.

3. The screen bar of claim 1 wherein the core steel layer comprises at least two layers that are positioned adjacent to one another and are interconnected by roll cladding.

4. The screen bar of claim 1 wherein a hardness of the top steel layer and a hardness of the bottom steel layer exceed 500 HBW.

5. The screen bar of claim 1 wherein a hardness of the core steel layer is 350-500 HBW.

6. The screen bar of claim 1 wherein a composition of the core steel layer contains iron, impurities, and in percentage by weight 0.16-0.22% C, 0.15-0.40% Si, 0.90-1.45% Mn, 0.02-0.1 Al, 0.45-1.05% Cr, up to 0.033% Nb, up to 0.65% Mo, up to 2.0% Ni, up to 0.0035% B, and 0.0007-0.0030% Ca.

7. A bar screen having at least one screen bar according to claim 1.

8. A method for manufacturing the screen bar according to claim 1, the method comprising:
   providing a first hot-rolled steel plate that forms the core steel layer of the steel composite sheet;
   providing two hot-rolled steel plates that form the top steel layer and the bottom steel layer of the steel composite sheet;

positioning the steel plates into a stack such that the core steel layer is placed above the bottom steel layer and such that the top steel layer is placed above the core steel layer;

connecting the bottom steel layer, the core steel layer, and the top steel layer of the stack in a fixed non-releasable manner;

heating the stack to an initial temperature for hot rolling;

hot rolling the stack; and cutting the screen bar from the stack.

9. The method for manufacturing the screen bar according to claim 8, the method further comprising cleaning and straightening faces of the steel plates.

10. The method for manufacturing the screen bar according to claim 8, the method further comprising:

hot rolling the stack by reheating the stack to the initial temperature between any sub-steps of the hot rolling step;

heat-treating the stack, wherein the heat-treating comprises:

heating the stack to a temperature that is above a highest of Ac3 temperatures for steel types corresponding to the bottom steel layer, the core steel layer, and the top steel layer;

quenching the stack at a rate sufficient to generate hardened structures in the bottom and top steel layers of the stack; and tempering the quenched stack.

11. The method for manufacturing the screen bar according to claim 8, the method further comprising post-machining the screen bar cut from the stack.

12. A method for manufacturing the screen bar according to claim 1, the method comprising:

providing a first hot-rolled steel plate that forms the core steel layer of the steel composite sheet;

providing two hot-rolled steel plates that form the top steel layer and the bottom steel layer of the steel composite sheet;

cleaning and straightening faces of the steel plates;

positioning the steel plates into a stack such that the core steel layer is placed above the bottom steel layer and such that the top steel layer is placed above the core steel layer;

connecting the bottom steel layer, the core steel layer, and the top steel layer of the stack in a fixed non-releasable manner;

heating the stack to an initial temperature for hot rolling;

hot rolling the stack, wherein the stack is reheated to the initial temperature between any sub-steps of the hot rolling step;

heat-treating the stack, wherein the heat-treating comprises:

heating the stack to a temperature that is above a highest of Ac3 temperatures for steel types corresponding to the bottom steel layer, the core steel layer, and the top steel layer;

quenching the stack at a rate sufficient to generate hardened structures in the bottom and top steel layers of the stack; and tempering the quenched stack;

cutting the screen bar from the stack; and post-machining the screen bar cut from the stack.

* * * * *